May 5, 1936.  G. R. CUNNINGTON  2,039,521

TRACTOR LUG

Filed Nov. 2, 1932  2 Sheets-Sheet 1

INVENTOR
George R. Cunnington
BY Evans & McCoy
ATTORNEY

May 5, 1936.　　　G. R. CUNNINGTON　　　2,039,521

TRACTOR LUG

Filed Nov. 2, 1932　　　2 Sheets-Sheet 2

INVENTOR
George R. Cunnington
BY Evans & McCoy
ATTORNEYS

Patented May 5, 1936

2,039,521

UNITED STATES PATENT OFFICE 2,039,521

TRACTOR LUG

George R. Cunnington, Akron, Ohio, assignor to The General Tire & Rubber Company, Akron, Ohio, a corporation of Ohio Application November 2, 1932, Serial No. 640,755

14 Claims. (Cl. 301—44)

This invention relates to a protective lug adapted to be secured over a tractor spade, and more particularly to a cushioning lug which imparts new and important qualities to a tractor spade in its operation.

A tractor ground-engaging spade commonly comprises a substantially V-shaped steel member having flanges which are apertured for securing the spade to the periphery of a tractor wheel or to a track shoe by means of bolts or the like. A plurality of these spades are disposed along each periphery of a tractor wheel and each row is staggered relative to the other row. These spades normally sink into the earth over which the tractor is caused to pass and provide increased traction for the machine. In some makes of tractors, endless chains of track shoes, each provided with a spade, are used to make up the track assembly.

Impacts, which occur upon the driving of a tractor equipped with unshielded spades over hard land, improved roads or pavement, set up a continuous chain of vibrations which are transmitted throughout the tractor. These vibrations impose unnecessary strains upon the mechanism of the tractor and are very fatiguing to the operator of the tractor. The driving of a tractor equipped with unshielded spades over improved, hard surfaced or paved roads rapidly cuts away the road surface, because of the penetration and loosening of the surface material by the sharp edges of the spades. This is particularly true of hard surfaced rural roads during the wet season and of asphalt roads during the hot summer months. For this reason, owners of tractors have experienced great difficulty in certain seasons of the year in moving their machines even for short distances, and in some States there is legislation against the use of a tractor with unshielded spades on the hard surfaced roads.

In attempting to use a tractor in orchard land or in cultivated land, which is usually moist and soft, the spades are objectionable in that they cut the lateral surface roots of trees and plants, load up with soil and mud which interferes with the operation of the machine, provide poor traction since they slice their way through the soil, and are objectionable in other ways peculiar to particular circumstances.

The present invention largely obviates these difficulties by providing a tractor spade protecting lug which converts a ground-engaging steel spade into a rubber or composition tread member, which has many advantages in addition to overcoming the difficulties mentioned.

An object of the present invention is to provide a cushioning device for use on the spades of a tractor wheel and which absorbs, to a large extent, the tractional vibrations of land surface contact.

Another object is to provide a road contacting cushioning device for tractor spades, for use on paved or improved highways, which protects the highways from injury.

Another object is to provide a rubber cushioning device for tractor spades which is properly shaped to accommodate the path of travel followed by the tractor spades and to secure a maximum of tractional advantage.

Another object is to provide a spade lug which may be used in orchards and cultivated land with minimum injury to the lateral surface roots of growing trees and plants.

Another object is to provide a covering for tractor spades which may be installed upon or removed from the spades with very little effort or difficulty.

A further object is to provide a metal reinforced, rubber cushioning device for covering the road-contacting portion of a tractor spade, which may be manufactured by simple and inexpensive methods.

With the above and other objects in view, which will be apparent from the following detailed description, the present invention may be said to consist in certain features of construction and combinations of parts which will be readily understood by those skilled in the art to which this invention appertains.

In the drawings, which illustrate a suitable embodiment of the invention,

Figure 1:
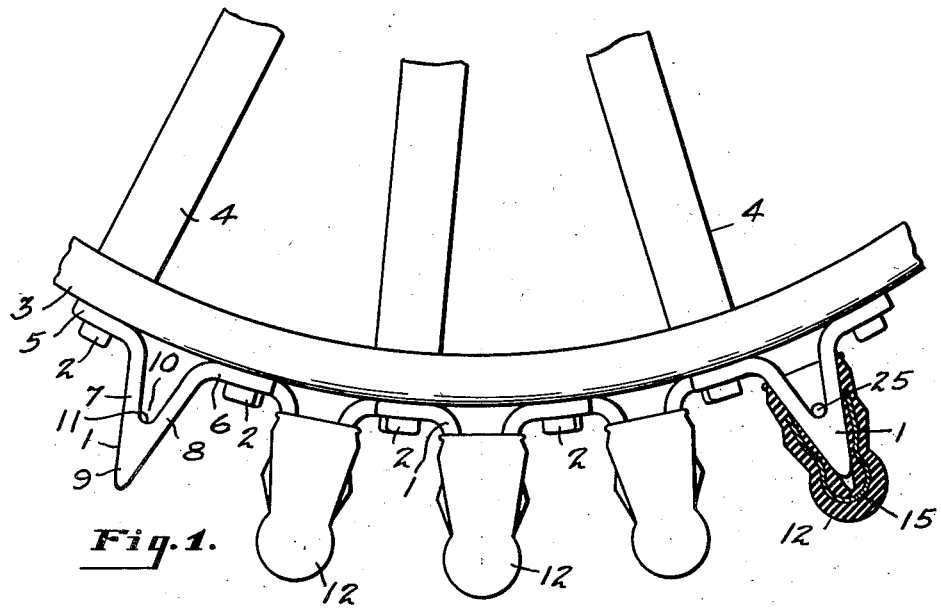
Figure 1 is a side view of a portion of a tractor wheel showing a plurality of spades secured to the periphery of the wheel rim in staggered relation with each other and showing protecting lugs mounted upon some of the spades with one lug shown in section.

In the accompanying drawings a plurality of tractor spades 1 are secured by bolts 2 in staggered relation along the periphery of a tractor wheel rim 3 having a plurality of spokes 4. In the form of spade shown, flanges 5 and 6, which rest against the periphery of the wheel rim, impart stability to the spade and are continuous with the spade sides 7 and 8 which converge to form a solid tip portion 9 and a channel 10 positioned radially inwardly of the solid tip portion 9.

Figures 2, 3:
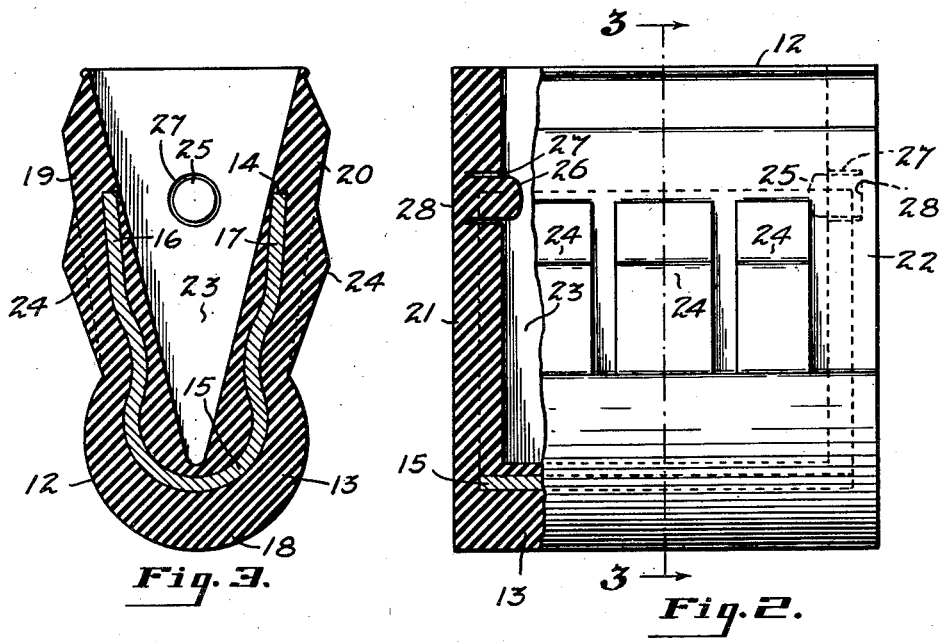
Fig. 2 is an enlarged side view, partly in section, of the form of lug shown in Fig. 1 and having securing means which assists in retaining the lug upon the spade, where the lugs are subjected to severe service conditions.
Fig. 3 is an enlarged sectional view taken along line 3—3 of Fig. 2, of the form of lug shown in Figs. 1 and 2.

A preferred form of lug 12 is shown in Figs. 1, 2 and 3. Each lug 12 preferably consists in a body portion 13, which is preferably formed of about the same grade of rubber compound as is used in the construction of solid and cushion tires, and a metal insert 14 which is formed preferably of sheet steel of suitable gauge and thickness to impart sufficient strength to the insert for the service to which it is to be subjected. Each metal insert is preferably plated with brass or other material to provide a surface which will bond strongly with the rubber composition forming the body portion 13 of the lug.

Each metal insert 14 consists of a more or less cylindrical portion 15 that terminates in slightly flaring side portions 16 and 17. The body portion 13 of the lug consists of a more or less cylindrical road-engaging nose portion 18, side walls 19 and 20, and end walls 21 and 22. The lug cavity 23 is shaped to conform substantially to the external shape of a tractor spade. A plurality of raised radial ridges 24 having grooves therebetween are formed on the side walls of the lugs to assist in breaking any suction that developes when working in mud and the like. Each of these ridges is shown as formed and positioned so that its midportion is somewhat thicker than its two ends, and preferably so that its midportion is disposed approximately midway of the side walls of the lug. The lug 12 may be held in place on the tractor spade by the close fit of the lug on the spade, which has been found very satisfactory, or by supplemental securing means, such as are about to be described.

Means for securing a lug in position upon a tractor spade may be provided by inwardly extending plugs 25 and 26 that are carried by the end walls 21 and 22 of a lug. Each plug 25 and 26 is preferably formed of the same material as the body of the lug. A suitable cylindrical clearance 27 is preferably provided around each plug and is of sufficient depth to form a thin and flexible wall 28 adjacent the base of the plug. This permits the lug to more readily snap into locking position between the arms 7 and 8 of the tractor spade. The nose portions of the plugs 25 and 26 are preferably slightly rounded and are of suitable dimension to properly seat within the cylindrical portion 11 of the channel 10 adjacent the tip 9.

The cylindrical tread portion 18 of the lug is of such radius as to permit the necessary rolling motion of the tread contact during operation. The more narrow neck portion at the base of the cylindrical tread portion assists in packing dirt back of the tractor lug in operation and, by actual test, has shown considerable increase of tractive effort as compared with the use of bare tractor spades. Moreover, the rubber body of the lug releases mud more readily than the metal spade because the spade soon becomes rusted and pitted, whereas the rubber lug is lubricated by the moisture in ground that tends to stick and the rubber body of the lug deforms under the weight of the tractor to assist in freeing the lug of such mud as has collected on it, even when the mud has hardened. As heretofore set forth, the grooves between the radial ribs 24 assist in breaking the suction formed about the spade in service, so that the spade may be used with complete satisfaction without any extra securing means, such as the plugs 25 and 26.

Figures 4, 5:
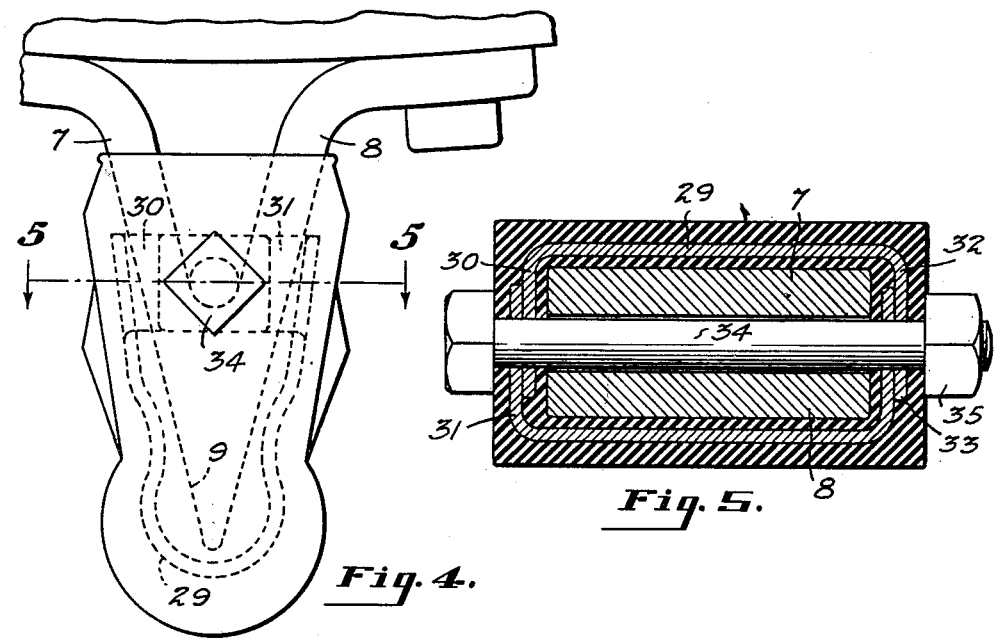
Fig. 4 is an enlarged sectional view of a modified form of lug in mounted position upon a tractor spade.
Fig. 5 is a sectional view of the form of lug shown in Fig. 4, taken along line 5—5 of Fig. 4.

A modified form of tractor lug is shown in Figs. 4 and 5. In this construction a metal insert 29 is used which is of substantially the same general construction as the insert previously described, with the exception of the overlapping ears 30 and 31 on one side and 32 and 33 on the other side. Each pair of ears is punched at a proper position for the reception of a suitable securing means, such as the bolt 34, within the cylindrical portion 11 of the channel 10. A nut 35 may be used for holding the bolt 34 in place.

Figure 6:
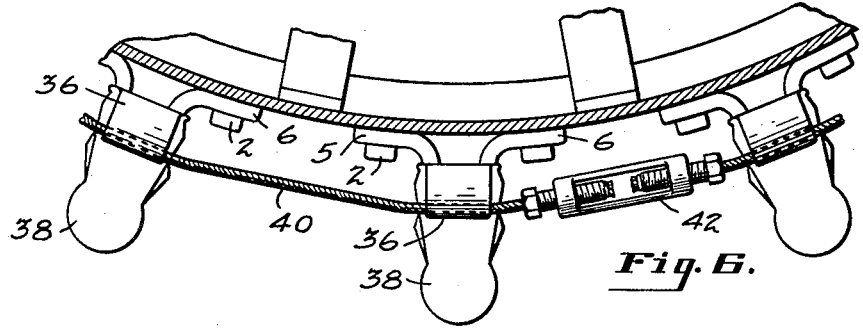
Fig. 6 is a sectional side view of a tractor wheel showing a plurality of circumferentially aligned spades equipped with protecting lugs that have hook portions that receive a cable for securing the lugs in place in severe service conditions.
Figure 7:
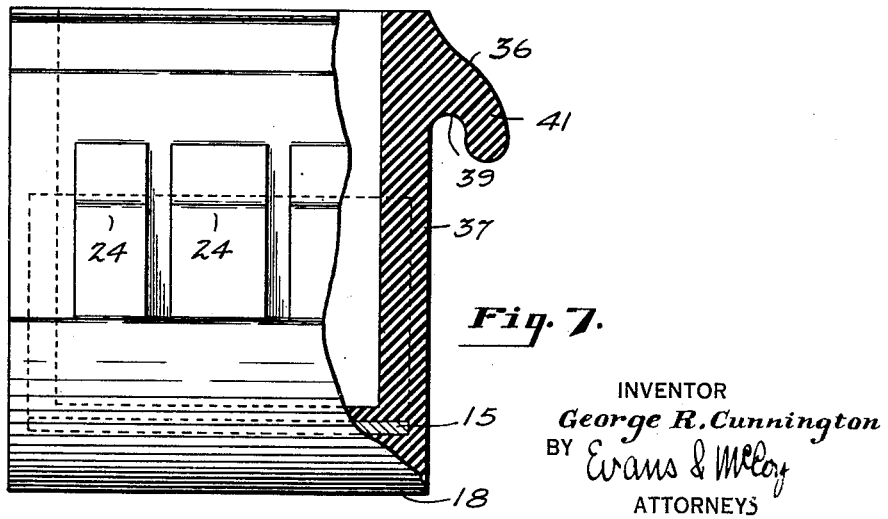
Fig. 7 is an enlarged side view, partially in section, of the form of lug shown in Fig. 6.

A modified form of lug-securing means is shown in Figs. 6 and 7, wherein a cable hook 36 is formed on the end wall of the lug for receiving suitable securing means, such as the cable 40. The upstanding side portion 41 of the hook is of sufficient height to prevent the accidental displacement of the cable. Any suitable connecting and adjusting means, such as the turnbuckle 42, may be used to hold the cable snugly in the hook portions of the lug. If desired, the cable hook may be replaced by mechanical equivalents such as a projection which is apertured for the accommodation of the cable. Fabric insert material or other usual reinforcement may be used to strengthen the tensile characteristic of the material forming such a projection, if deemed desirable. The cable hook or projection and the cable preferably should be mounted on the wall of the lug that extends toward the median plane of the wheel rim.

The mounting of the form of lug shown in Figs. 1 to 3 inclusive, upon a tractor spade, is accomplished very easily. The lug is driven down part way on the spade. The tractor is then operated and the weight of the tractor securely seats the lugs on the tractor spades. During this fitting operation, the exposed tips of the plugs 25 and 26 contact with the tip portion 9 of the spade and, upon pressure being applied to the lug, the plugs are forced to partially retract within the cylindrical aperture 27 by the yielding of the thin walls 28 at the base of each plug. Upon the application of additional pressure, the lug is caused to completely seat itself upon the spade so that the plugs 25 and 26 enter between the legs 7 and 8 of the spade, where they are free to return to their original positions, thus locking the lugs in place. The sides of the plugs then act as stops and are of ample strength to prevent the accidental dislodgment of the lugs.

The mounting of the form of lug shown in Figs. 4 and 5 is accomplished by the positioning of a lug tightly upon a spade and then inserting the bolt 34 through the bolt holes formed through the pairs of ears 30, 31 and 32, 33, so that the bolt rests within the cylindrical portion of the channel 10. Tightening the nut 35 upon the end of the bolt secures the lug upon the spade.

The mounting of the lug shown in Figs. 6 and 7 is accomplished by the positioning of the lugs upon those spades which are aligned circumferentially along one side of the tractor wheel rim. The cable hooks 36 are preferably positioned away from the edge of the rim of the tractor wheel, so that they are less subject to damage. The cable 40 is then placed within the channels 39 provided therefor, and the cable 40 is tightened by means of the turnbuckle 42. A similar installation may then be made upon those spades which are in circumferential alignment upon the other side of the tractor wheel rim.

In all of these forms of spade lugs, it will be seen that the wedge shape of the spade acting on the rubber body of the lug tends to distribute the stresses to the metal insert, even when the nose of the spade is considerably worn. The nose of the metal insert has a relatively large radius as compared with the spade and the rubber body of the lug overlying the nose of the metal insert is of substantially uniform thickness over the nose portion of the lug. This serves to distribute the driving stresses so that the rubber is not separated from the metal insert. The relatively large radius of the rubber lug provides a rolling contact for the lug rather than the forward sliding road contact that appears somewhat with uncovered spades and the driving and weight supporting stresses in the lug are well distributed over the nose portion of the lug.

The use of rubber lugs upon tractor spades imparts several important advantages to the tractor spades.

The resilience of the lug operates to materially decrease the vibrational strains suffered by both the mechanism of the tractor and by the operator of the tractor. This same quality of the lug greatly decreases the damage caused to hard surfaced and paved roads upon which the tractor may be used. It also prevents damage to the lateral roots of trees and plants where the tractor is used on cultivated land between or beside the rows of growing plants.

The lug, being preferably formed of rubber and being shaped to advantageously use the locus of motion followed by a tractor spade in its contact with the earth, tends to automatically clean itself upon leaving wet or muddy soil, by a rolling motion and by the nonadhesive properties possessed by the wet, smooth, rubber surfaces, with which surfaces water acts as a natural lubricant. Where the tractor is used on wet, extremely adhesive, adobe or clay soils, and some soils is retained upon parts of the lug where it later dries, this dry clay is caused to crack away from the surface of the lug by the flexing of the rubber body portion of the lug when the tractor is again used.

When used in sandy soil, or in loose dirt, the lug materially improves the tractive advantage of the spade by packing the material against the nose and the side of the lug instead of sinking in and slicing its way through, as the bare spade does.

A lug assumes all of the wear to which a spade would otherwise be subjected and makes the service period of a set of spades practically limitless.

It also has been found in actual use that a rubber lug without securing means will lock itself upon a spade with sufficient security for all ordinary service and may be depended upon to remain in place under most types of work, even without employing any of the forms of locking means described herein.

It is to be understood that the particular embodiments of the invention shown and described are shown for purposes of illustration and explanation and that various modifications in the particular contour and in the particular materials from which either the body portion or the metal insert portion of the lug is made, may be used without departing from the invention as defined in the appended claims.

What I claim is:

1. A lug for use on tractor spades that comprises a body of rubber composition having a cylindrical road contacting nose portion, a neck portion of less thickness than the nose portion, and a metal insert completely embedded in said body and serving as a reinforcement therefor and having an intermediate portion substantially concentric with said cylindrical road contacting nose portion and substantially parallel leg portions.

2. A lug for use on a tractor spade comprising a body of rubber composition having a cavity for closely fitting the tractor spade, a nose portion of cylindrical shape terminating in a neck portion of less transverse width than said nose portion, and a plurality of radially extending ribs on the side portions of said lug forming suction releasing grooves therebetween and terminating at the neck portion, and a U-shaped metal insert completely embedded in said body and having leg portions extending substantially along opposite ground-engaging side faces of said lug.

3. A lug for mounting upon a tractor spade, comprising a rubber body portion having a cavity formed therein for the accommodation of a tractor spade, a substantially cylindrical end portion forming a part of said rubber body portion and designed to overlie said tractor spade, a metal insert completely embedded within said rubber body portion, and a substantially cylindrical portion of said metal insert embedded within the cylindrical portion of said rubber body portion of said lug and also positioned to overlie said tractor spade but in spaced relation thereto, the cylindrical portions of said metal insert and of the rubber body portion being substantially coaxial to distribute in a substantially uniform manner traction stresses in the body portion.

4. A protecting lug for a tractor spade, comprising a rubber body portion having an aperture formed internally of said body portion for the accommodation of said tractor spade and surrounded by side walls and end walls and serving to releasably secure said lug to said spade, and a metal insert overlying said tractor spade and extending along opposite sides of said tractor spade within said side walls and spaced inwardly from said tractor spade, thereby reinforcing the rubber in said body portion and side walls.

5. A tractor spade covering lug comprising a rubber body portion including side and end walls formed of material which is structurally continuously homogeneous, and a plug member forming a part of one of said walls and being positioned to act as a stop against a portion of said tractor spade, and a substantially annular space surrounding said stop so as to increase the resiliency of the wall adjacent said plug.

6. Tractor spade covering lugs, each comprising a body portion of rubber composition having a substanttially cylindrical road-engaging nose portion and side and end walls shaped to enclose a portion of a spade, a projection on an end wall of said body portion, a cable engaging said projections for securing each of said lugs on a tractor spade, and an insert of relatively stiff material completely embedded within the said body portion including the cylindrical road-engaging nose portion and side walls and arranged to distribute stresses applied to said body portion.

7. A cushioning lug for an apertured tractor spade comprising, a rubber body portion consisting of side and end portions, a metal insert having a substantially cylindrical portion overlying the outer end of the tractor spade, a pair of apertured ear portions overlying each other and forming an end part of said metal insert, said ear portions being apertured, whereby securing means may be passed through the apertures formed in said ear portions of said metal inserts and through said tractor spade for positively securing said lug on said tractor spade.

8. A rubber protecting lug for a tractor spade comprising a body portion of rubber having a substantially cylindrical nose portion and spade contacting side walls defining a spade receiving aperture and serving to releasably secure said lug to said spade, suction releasing means constituting a part of said rubber body portion of said lug, and a metal insert having spaced portions completely embedded within said side walls and a connecting portion completely embedded in said cylindrical nose portion.

9. A rubber protecting lug for a tractor spade comprising a lug body portion of rubber having a road engaging nose portion and spade enclosing side walls defining a spade fitting aperture and serving to releasably secure said lug to said spade, the nose portion having a substantially cylindrical external surface, suction releasing means constituting a part of said side walls of said rubber body portion of said lug, and a U-shaped metal reinforcing insert embedded within said body of rubber and having a substantially cylindrical portion disposed substantially concentric with the cylindrical surface of said nose portion.

10. A lug for forming a removable tread for a tractor spade comprising a rubber body portion having a substantially cylindrical nose portion and spade surrounding side and end walls defining a cavity therein of substantially the external contour of said tractor spade, said rubber body portion serving to releasably secure said lug to said spade, suction releasing means constituting a part of said side walls of said rubber body portion of said lug, and a metal insert completely embedded within and vulcanized to said rubber body portion and serving to reinforce said nose portion and said side walls.

11. A lug for an apertured tractor spade comprising, a rubber body portion, a metal insert embedded in and reinforcing said rubber body portion and having a substantially cylindrical portion overlying a portion of said tractor spade, side portions forming parts of said metal insert and extending along the sides of and terminating at a position removed from the cylindrical portion of the rubber body portion overlying a portion of the tractor spade, ear portions formed of material that is structurally continuously homogeneous with said metal insert and containing apertures registering with the aperture in said tractor spade, and means disposed in said apertures in said ear portions of said metal insert and serving to secure said lug to said spade.

12. A lug for tractor spades, comprising a metal insert, a rubber body portion completely enclosing and bonded to said metal insert and serving to releasably secure said lug to said spade, a substantially flat lateral portion forming a part of said rubber body portion, and rounded side portions forming parts of said rubber body portion.

13. A lug for tractor spades, comprising a reinforcing metal insert, a substantially cylindrical portion forming a part of said metal insert, curved strengthening portions forming a part of said metal insert and formed continuous with the cylindrical portion thereof, slightly flared side portions forming a part of said metal insert and continuous with said strengthening portions, a rubber composition body portion completely enclosing said metal insert and suction releasing means disposed in the surface of said body portion of said lug.

14. A lug for tractor spades, comprising a body portion of resilient material suitably apertured for the reception of a tractor spade and of sufficiently adhesive property to be retained by said tractor spade in operation, a metal insert substantially completely embedded within the body portion of said lug, a portion of said body portion being positioned to be interposed between said metal insert and the tractor spade when said lug is in mounted position on said tractor spade, a substantially cylindrical surface portion of said body portion forming the road-contacting surface of said lug, and a plurality of spaced ridges projecting outwardly of said body portion of said lug.

GEORGE R. CUNNINGTON.